(12) United States Patent
    Riester (10) Patent No.: US 9,816,811 B2
(45) Date of Patent: Nov. 14, 2017

(54) MEASURING DEVICE

(71) Applicant: JENOPTIK Industrial Metrology Germany GmbH, Villingen-Schwenningen (DE)

(72) Inventor: Thomas Riester, Villingen-Schwenningen (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 205 days.

(21) Appl. No.: 14/968,673

(22) Filed: Dec. 14, 2015

(65) Prior Publication Data

US 2016/0169655 A1    Jun. 16, 2016

(30) Foreign Application Priority Data

Dec. 16, 2014  (DE) .......................... 10 2014 118 756

(51) Int. Cl.
    *G01B 21/04*    (2006.01)

(52) U.S. Cl.
    CPC ................................ *G01B 21/047* (2013.01)

(58) Field of Classification Search
    CPC ........ G01B 5/285; G01B 11/08; G01B 11/24; G01B 21/02; G01B 21/16; G01B 21/20; G01B 5/003; G01B 5/08
    USPC .......................................................... 33/542
    See application file for complete search history.

(56) References Cited

U.S. PATENT DOCUMENTS

| | | | |
|---|---|---|---|
| 4,403,860 A * | 9/1983 | Pryor ..................... | G01B 11/00 33/542 |
| 5,095,634 A * | 3/1992 | Overlach ............... | G01B 5/003 33/543 |
| 8,964,023 B2 * | 2/2015 | Neumann .............. | G01B 21/02 348/135 |
| 9,562,756 B2 * | 2/2017 | Seewig ................. | B24B 49/045 |
| 9,683,914 B2 * | 6/2017 | Dietz .................... | G01M 13/04 |
| 2002/0083608 A1 * | 7/2002 | Stephens ............... | G01B 5/201 33/555 |
| 2016/0169655 A1 * | 6/2016 | Riester ................. | G01B 21/047 33/542 |

* cited by examiner

*Primary Examiner* — Yaritza Guadalupe-McCall
(74) *Attorney, Agent, or Firm* — Shlesinger, Arkwright & Garvey LLP (57) ABSTRACT

Measuring device for measuring a rotationally symmetrical cavity in a workpiece has a base body for supporting on the workpiece, and a measuring head with a sensor for scanning the inner wall of the cavity. The measuring device has a shaft connected to the base body. Measuring head is movable relative to base body in the axial direction of the shaft and is rotatable about a rotational axis defined by the shaft. The shaft is configured as a hollow shaft, and accommodates a drive shaft rotationally drivable by a rotary drive apparatus. A distal end of the drive shaft is connected to the measuring head in a rotationally fixed manner. The shaft is situated on the base body and movable in the axial direction of the shaft by a slide bearing system. An axial drive apparatus moves the shaft relative to the base body.

14 Claims, 6 Drawing Sheets

MEASURING DEVICE

FIELD OF THE INVENTION

The present invention relates to a measuring device of the type for measuring a rotationally symmetrical cavity in a workpiece.

BACKGROUND OF THE

Measuring devices of this type are generally known, and are used within the scope of dimensional production measurement technology, in particular for measuring cylinder bores in internal combustion engines for motor vehicles. The known measuring devices have a base body for supporting on the workpiece, and a measuring head which has at least one sensor for scanning the inner wall of the cavity. The known measuring devices also have a shaft that is connected to the base body, the measuring head being movable relative to the base body in the axial direction of the shaft and rotatable about a rotational axis defined by the shaft in the known measuring devices, the shaft is used as a guide shaft, along which the measuring head moves in the axial direction in order to be able to approach different axial locations on the inner wall in the axial direction of the cylinder bore, and about which the measuring head rotates in order to scan the inner wall of the cylinder bore in its peripheral direction.

OBJECTS AND SUMMARY OF THE INVENTION

An object of the invention is to provide a measuring device for measuring a rotationally symmetrical cavity in a workpiece, whose applications are expanded.

This object is achieved by the invention set forth herein.

Another object of the invention is to provide a measuring device for measuring a rotationally symmetrical cavity in a workpiece, and which measuring device is configured for measuring a cylinder bore.

The invention is based on the concept of expanding the applications of the measuring device by designing and configuring the measuring device in such a way that it may also be used in cavities, in particular cylinder bores, having a relatively small diameter.

On this basis, the invention departs from the concept of situating the measuring head on the shaft. Rather, the invention provides that the shaft is designed as a hollow shaft, and accommodates a drive shaft that is rotationally drivable by means of a rotary drive apparatus, the distal end of the drive shaft being connected to the measuring head in a rotationally fixed manner. Since according to the invention the rotary drive of the measuring head is effected by a drive shaft accommodated in the shaft, and the measuring head is therefore no longer situated radially outwardly on the shaft, the radial installation space of the distal end of the device bearing the measuring head is thus reduced. The measuring device may thus also be used in cavities, in particular cylinder bores, having a relatively small diameter. Depending on the particular requirements, the shaft may be designed with a relatively small diameter.

Another advantage of this arrangement is that the rotary drive may take place from the proximal end of the drive shaft, i.e., the end facing away from the measuring head, so that the guiding of electrical lines is greatly simplified.

To allow axial positioning of the measuring head, the invention further provides that the shaft is situated on the base body so as to be movable in the axial direction of the shaft by means of a slide bearing system, an axial drive apparatus being provided for moving the shaft relative to the base body.

According to the invention, axial positioning of the measuring head thus takes place by moving the shaft relative to the base body, scanning of the inner wall of the cavity in its peripheral direction taking place by rotating the measuring head relative to the shaft by means of the drive shaft.

Another advantage of the measuring device according to the invention is that the complicated play-free adjustment of the measuring head on the shaft, which is necessary in known measuring devices, is dispensed with. In addition, the service life of the measuring device according to the invention is prolonged due to the fact that the wear is reduced in comparison to the known measuring devices, in which the positioning of the measuring head in the axial direction as well as in the peripheral direction takes place by moving the measuring head on the shaft.

The invention thus provides a measuring device which not only has high measuring accuracy, but which also is robust, relatively simple in design, and long-lasting.

According to the invention, the distal end of the shaft or of the measuring device is understood to mean the end of the shaft or of the measuring device which bears the measuring head, while the proximal end is understood to mean the end of the shaft or of the measuring device facing away from the measuring head.

According to the invention, a rotationally symmetrical cavity is understood to mean a cavity whose rough shape is rotationally symmetrical, while its fine shape may deviate from rotational symmetry. The measuring device according to the invention may be used in particular for determining deviations of the rough and/or fine shape from exact rotational symmetry.

An extremely advantageous further embodiment of the invention provides that the slide bearing system, by means of which the shaft is supported on the base body, has at least one slide bearing having a radially slotted inner part with a conical outer face situated on the shaft, and an outer part with a conical inner face which has a complementary shape with respect to the conical outer face of the inner part, wherein a clamp for clamping the inner part against the outer part is provided, such that the inner part is radially compressed by the outer part under the effect of the clamp. A radial play-free bearing of the shaft on the base body is achieved in this way. If/to the extent that wear occurs on the shaft due to axial relative movement of the shaft with respect to the base body, the inner part is compressed by the outer part under the effect of the clamp, so that a play-free bearing of the shaft on the base body is ensured, even in the event of wear. In this embodiment, the slide bearing system is designed in the manner of a collet chuck, whose effect, however, is utilized not for clamping in the known manner, but, rather, solely for centering the shaft on the housing. Another advantage of this embodiment is that the inner part is used as a wiper for wiping foreign bodies or impurities from the shaft.

In the above-mentioned embodiment, two slide bearings situated at a distance from one another in the axial direction of the shaft are advantageously provided, which represents an advantageous further embodiment of the invention.

Another advantageous further embodiment of the embodiment with the inner part and the outer part provides that the clamp has at least one spring, in particular at least one wave spring washer, situated coaxially with respect to the shaft. The clamp is implemented in a particularly simple manner by means of this embodiment. Suitable wave spring washers are available as relatively simple, inexpensive standard components.

To achieve the axial positioning of the measuring head by moving the shaft relative to the base body, one advantageous further embodiment of the invention provides that the shaft is nondisplaceably situated on a slide, which by means of a linear drive of the axial drive apparatus is movable relative to the base body along a linear axis, in the axial direction of the shaft.

One advantageous further embodiment of the above-mentioned embodiment provides that the linear drive is a spindle drive. Suitable spindle drives are available as relatively simple, inexpensive standard components having high positioning accuracy.

A further embodiment of the embodiment with the spindle drive provides that the spindle drive has a threaded spindle which is in rotary drive connection with an electric motor of the axial drive apparatus; a spindle nut which is movable in the axial direction is provided in a rotationally fixed manner on the threaded spindle, and is nondisplaceably connected to the slide. In this way, an axial drive apparatus for moving the shaft relative to the base body is implemented which has a simple design and at the same time has high positioning accuracy.

According to the invention, the rotary drive of the drive shaft, which is necessary for rotating the measuring head, may be implemented in any suitable manner, the rotary drive apparatus preferably having an electric motor. One advantageous embodiment which has a simple design and at the same time has high positioning accuracy during scanning of the inner wall of the cavity provides that the drive shaft is in rotary drive connection with the output shaft of an electric motor of the rotary drive apparatus via a belt drive.

In the embodiment mentioned above, the electric motor of the rotary drive apparatus is advantageously situated on the slide, which represents a further embodiment. In this embodiment, the electric motor of the rotary drive apparatus thus moves together with the slide.

A further embodiment of the invention which is advantageous with regard to control provides that the rotary drive apparatus and the axial drive apparatus have electric motors that are independently controllable by a control apparatus. The axial positioning of the measuring head relative to the shaft, i.e., in the axial direction of a cavity to be examined, and the positioning in the peripheral direction of the shaft are thus separate from one another, so that any desired locations on the inner wall of the cavity may be contacted during measurement of the cavity.

To design the measuring operation to be fully automatic, one advantageous further embodiment of the above-mentioned embodiment provides that the control apparatus is designed and configured for automatically controlling the electric motors according to a measuring program in such a way that during the measurement, the measuring head automatically approaches different locations on the inner wall in the peripheral, direction of the shaft and/or in the axial direction of the shaft.

Depending on the particular requirements, the measuring head of the measuring device according to the invention may have a sensor or multiple sensors. The sensor or the sensors may operate according to any suitable measuring principle. One advantageous further embodiment of the invention provides that the sensor is a tactile sensor. However, contactless sensors, for example sensors which operate according to an optical measuring principle, may also be used according to the invention.

In order to design the base body of the measuring device according to the invention in a manner which is at the same time simple and functional, in this regard one advantageous further embodiment provides that the base body is a tubular part on which the slide bearing system is situated, and has a housing-like part in which the axial drive apparatus and the rotary drive apparatus are accommodated.

A cylinder bore measuring device according to the invention is set forth herein. The cylinder bore measuring device is used for measuring cylinder bores, and includes a measuring device according to the invention.

The invention is explained in greater detail below with reference to the appended drawings, in which one embodiment of a measuring device according to the invention in the form of a cylinder bore measuring device is schematically illustrated. In this regard, all features that are described, illustrated in the drawings, and set forth in their various embodiments or variations, alone or in any suitable combination, constitute the subject matter of the invention, regardless of their recapitulation herein, and regardless of their description or illustration in the drawings.

Relative terms such as left, right, up, and down are for convenience only and are not intended to be limiting.

DETAILED DESCRIPTION OF THE INVENTION

Identical or corresponding components are provided with the same reference numerals in the figures of the drawing.

Reference is made below to FIGS. 1 to 6 for explaining one embodiment of a measuring device according to the invention.

Figure 1:
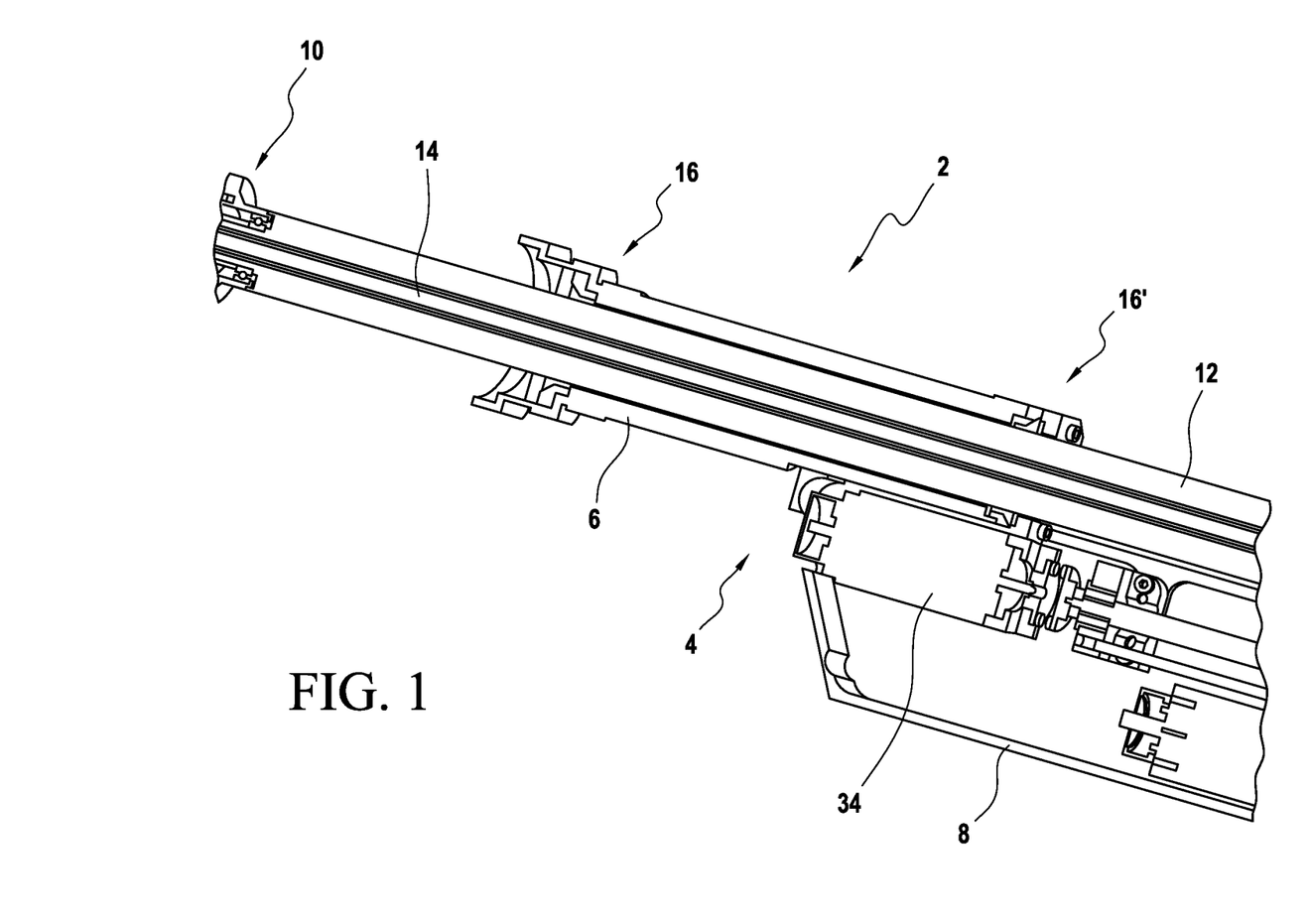
FIG. 1 shows a perspective sectional view of one embodiment of a measuring device according to the invention.
Figure 2:
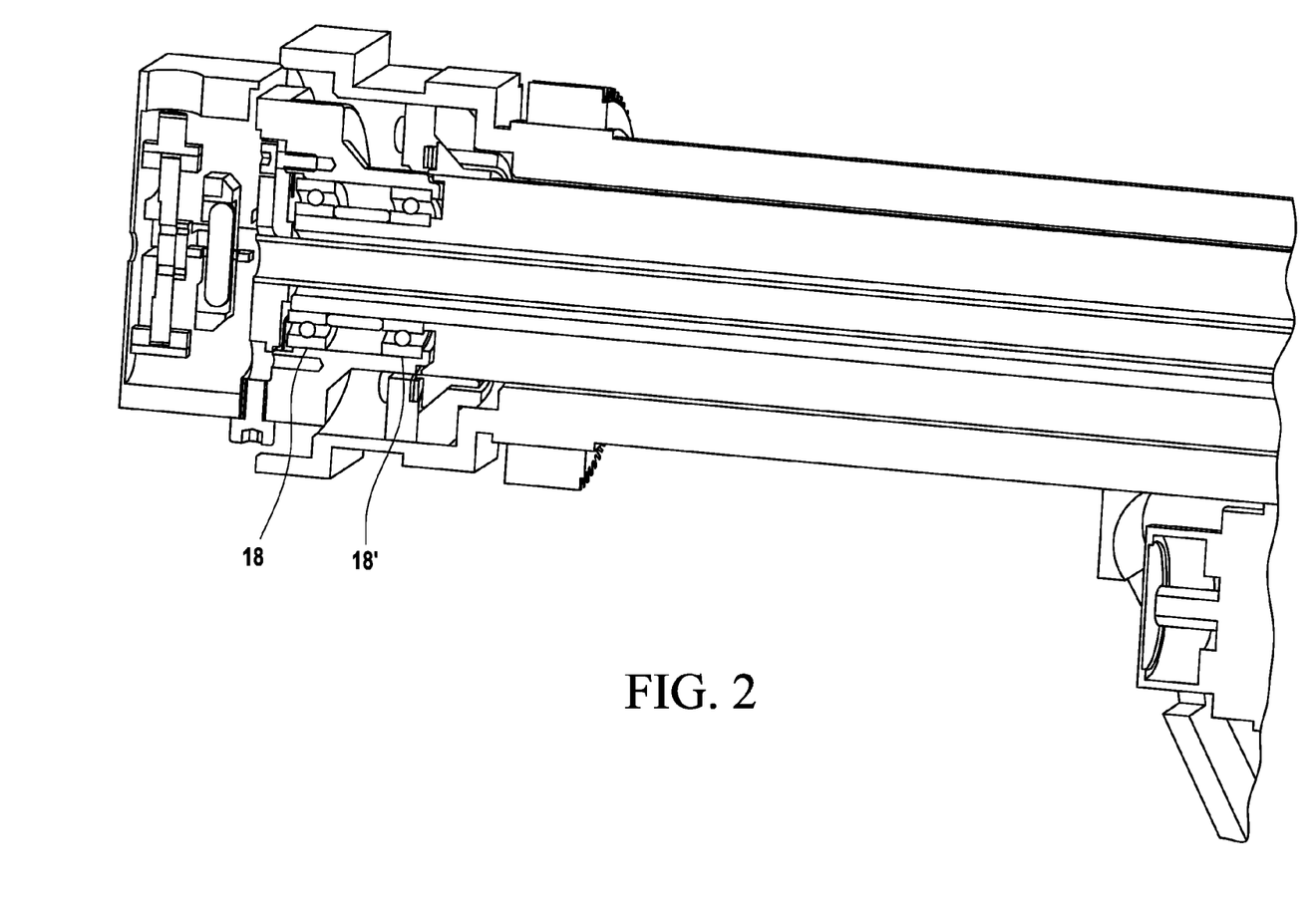
FIG. 2 shows, in an illustration similar to FIG. 1 but in enlarged scale, a detail in the area of the distal end of the measuring device according to FIG. 1.
Figure 3:
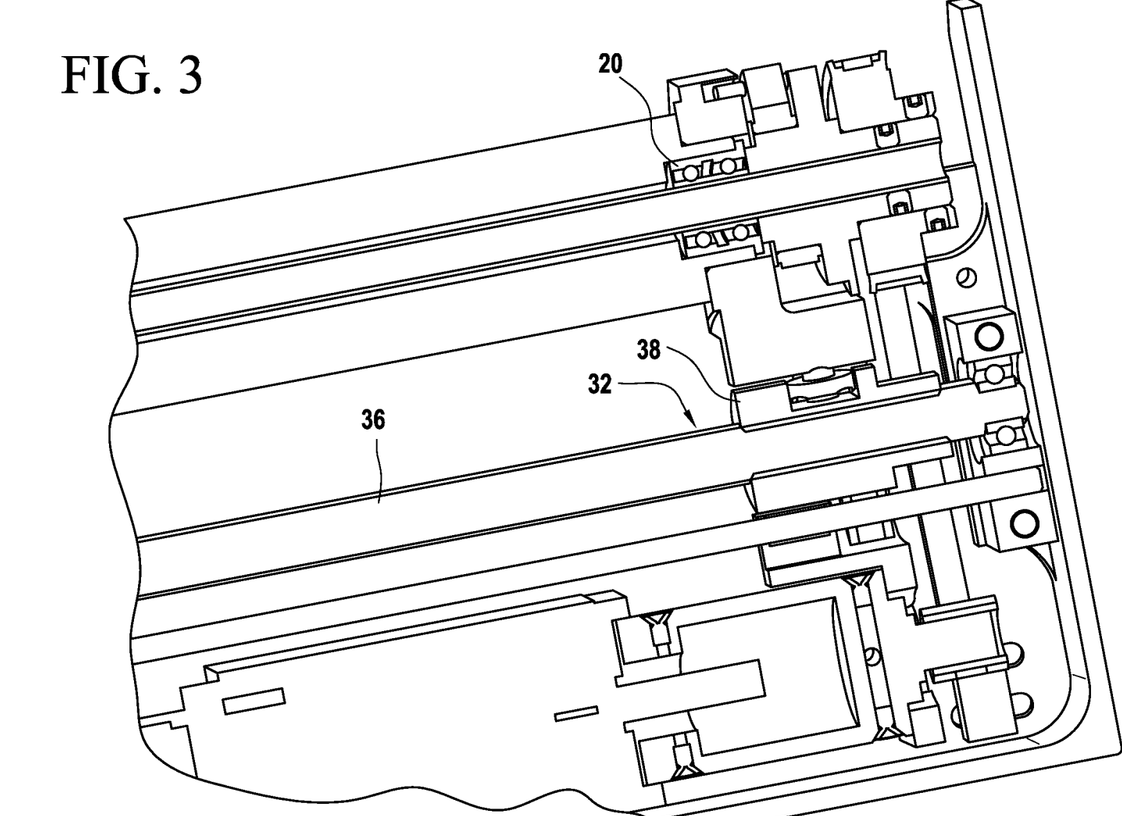
FIG. 3 shows, in an illustration similar to FIG. 1 but in enlarged scale, a detail in the area of the proximal end of the measuring device according to FIG. 1.

FIG. 1 illustrates one embodiment of a measuring device 2 according to the invention for measuring a rotationally symmetrical cavity in a workpiece, the measuring device being designed as a cylinder bore measuring device and used for measuring cylinder bores in internal combustion engines for motor vehicles. The measuring device 2 has a base body 4 for supporting on the workpiece. In the illustrated embodiment, the base body 4 has a tubular part 6 on which a slide bearing system, explained in greater detail below, is situated, and a housing-like part 8 in which an axial drive apparatus and a rotary drive apparatus, explained in greater detail below, are accommodated.

The measuring device 2 also has a measuring head 10 which has at least one sensor for scanning the inner wall of the cavity.

The measuring device 2 also has a shaft 12 that is connected to the base body 4, the measuring head 10 being movable relative to the base body 4 in the axial direction of the shaft 12 and rotatable about a rotational axis defined by the shaft 12.

According to the invention, the shaft 12 is designed as a hollow shaft, and accommodates a drive shaft 14 which is rotationally drivable by means of a rotary drive apparatus, explained in greater detail below, the measuring head 10 being connected to the distal end of the drive shaft in a rotationally fixed manner.

The shaft 12 is situated on the base body 4 so as to be movable in its axial direction relative to the base body by means of a slide bearing system; a further axial drive apparatus, explained in greater detail below, is provided for moving the shaft 12 relative to the base body 4. In this embodiment, the slide bearing system 2 has slide bearings 16, 16', explained in greater detail below, which are separated at a distance from one another in the axial direction of the shaft 12.

The measuring head 10 is connected in a rotationally fixed manner to the distal end of the drive shaft 14 (see FIG. 2), ball bearings 18, 18' being provided for rotatably supporting the measuring head 10 on the shaft 12. The drive shaft 14 is likewise rotatably supported on its proximal end via a ball bearing 20 (see FIG. 3).

A rotary drive apparatus for the drive shaft 14 has an electric motor 22 (see FIG. 4), the output shaft of which is connected in a rotationally fixed manner to a gearwheel, which via a toothed belt 26 is in rotary drive connection with a gearwheel 28, which in turn is connected in a rotationally fixed manner to the drive shaft 14.

Figure 4:
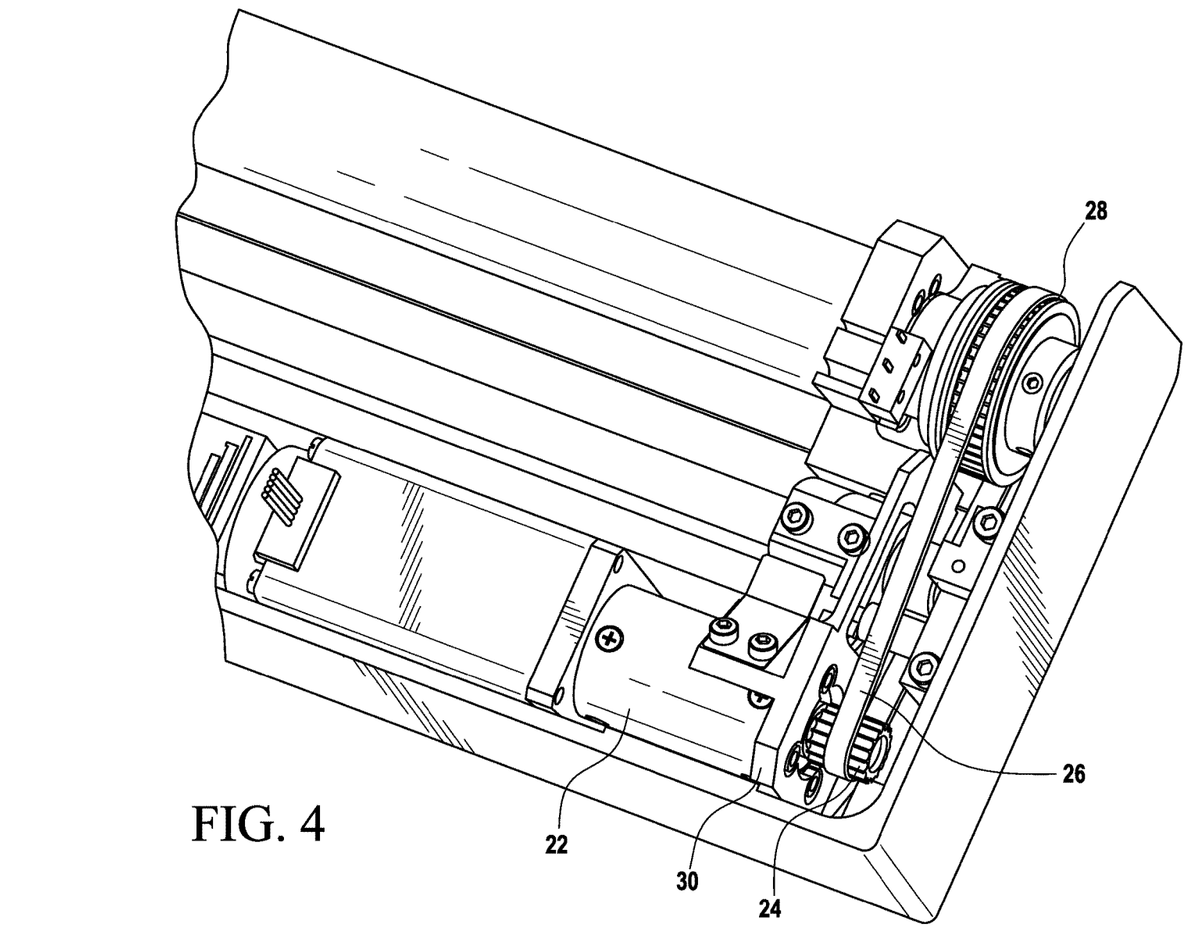
FIG. 4 shows the detail according to FIG. 3 in a modified illustration.
Figure 5:
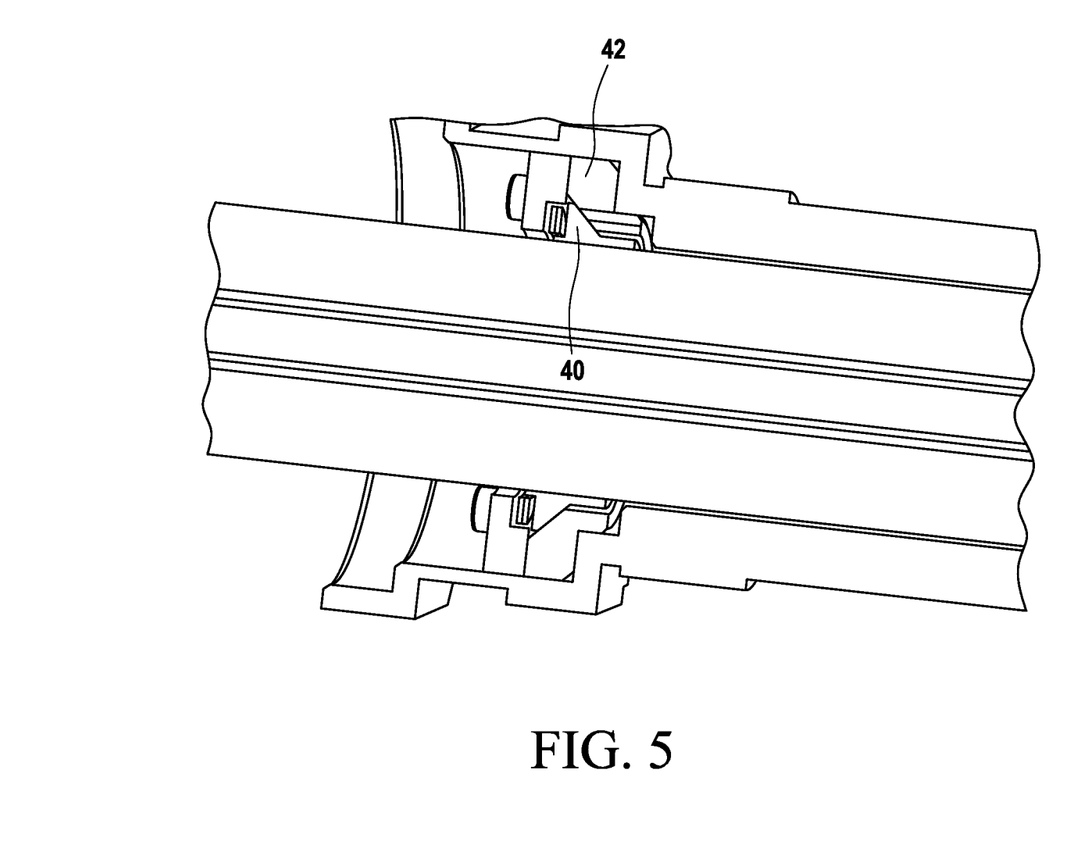
FIG. 5 shows, in an illustration similar to FIG. 1 but in enlarged scale, a detail in the area of a slide bearing of a slide bearing system of the measuring device according to FIG. 1.
Figure 6:
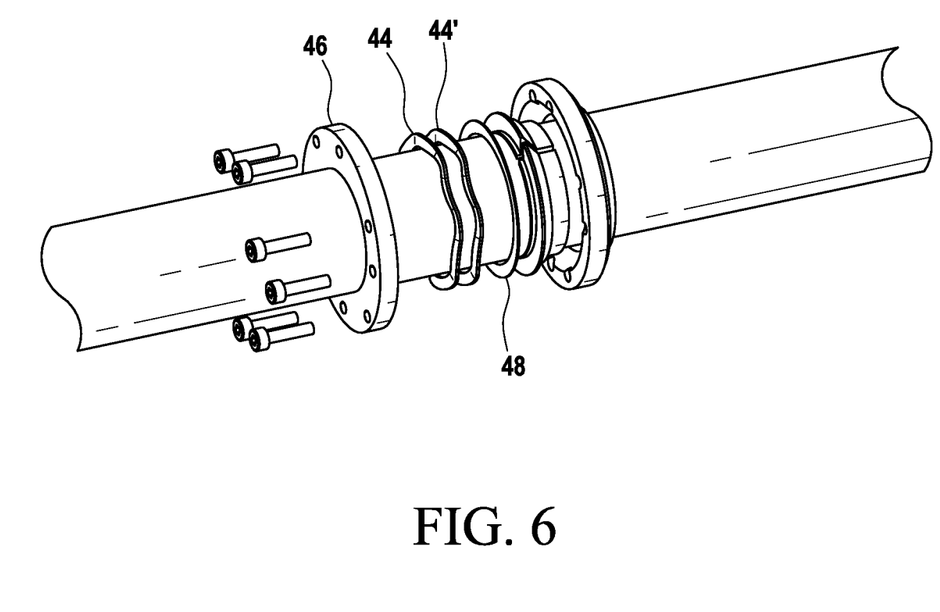
FIG. 6 shows a perspective exploded illustration of components of the slide bearing according to FIG. 5.

The shaft 12 is nondisplaceably situated on a slide 30 (see FIG. 4), which by means of a linear drive of the axial drive apparatus is movable relative to the base body 4 along a linear axis, in the axial direction of the shaft 12 in the illustrated embodiment, the linear drive has a spindle drive having a threaded spindle 36 which is in rotary drive connection with an electric motor 34 (see FIG. 1) of the axial drive apparatus, and on which a spindle nut 38 is situated in a rotationally fixed manner and movable in the axial direction (see FIG. 3), the spindle nut being nondisplaceably connected to the slide 30 (see FIG. 4).

As is apparent from the drawing (see FIG. 4), the electric motor 22 of the rotary drive apparatus is situated on the slide 30, so that when the shaft 12 moves axially relative to the base body 4, the entire rotary drive apparatus moves with the shaft.

The slide bearing 16 of the slide bearing system (see FIG. 1) is explained in greater detail below. The slide bearing 16' has a corresponding design, and therefore is not explained in greater detail.

The slide bearing 16 (see FIGS. 5 and 6) has a radially slotted inner part 40 with a conical outer face situated radially on the shaft 12, and an outer part 42 with a conical inner face, connected in the tubular part 6 of the base body 4, which has a complementary shape with respect to the conical outer face of the inner part. A clamp for clamping the inner part 40 against the outer part 42 is provided, such that the inner part 40 is radially compressed by the outer part 42 under the effect of the clamp. In this embodiment, the clamp has springs in the form of wave spring washers 44, 44 situated coaxially on the shaft 12 (see FIG. 6), which via a retaining part 46 screwed to the outer part 42 are held between the outer part 42 and the inner part 40, so that the inner part 40 is pretensioned against the outer part. Due to the cooperation of the conical outer face of the inner part 40 with the conical inner face of the outer part 42, the inner part 40 is radially compressed by the outer part 42 under the effect of the spring means in the form of the wave spring washers 44, 44', so that the shaft 12 is supported on the base body 4 without play. To ensure uniform transmission of the elastic force of the wave spring washers 44, 44' to the inner part 40 in the peripheral direction of the inner part 40, a flat disk 48 is situated between the spring washer 44' facing the inner part 40 and the inner part 40.

The mode of operation of the measuring device 2 according to the invention is as follows:

For measuring a rotationally symmetrical cavity in a workpiece, the base body 4 is supported on the workpiece, and the distal end of the shaft 12 bearing the measuring head 10 is inserted into the cavity. The base body 4 is fixed to the workpiece by means of a suitable fastening device.

The electric motor 22 of the rotary drive apparatus and the electric motor 34 of the axial drive apparatus are independently controllable by a control apparatus. The control apparatus is designed and configured for automatically controlling the electric motors 22, 34 according to a measuring program in such a way that during the measurement, the measuring head 10 automatically approaches different locations on the wall of the cavity to he measured, in the peripheral direction of the shaft 12 and in the axial direction of the shaft 12.

In order to position the measuring head 10 in the axial direction, the electric motor 34 drives the threaded spindle 36 in such a way that the spindle nut 38 and thus the slide are moved from their starting position (see FIG. 3) in the direction of a measuring position. The electric motor 34 drives the threaded spindle 36 up to the desired axial position of the shaft 12, and thus of the measuring head 10, is reached.

In the desired measuring position, the inner wall of the cavity is scanned by means of the sensor of the measuring head 10, which in the illustrated embodiment is a tactile sensor.

In order to scan the inner wall in its peripheral direction, which corresponds to the peripheral direction of the shaft 12, the electric motor 22 drives the drive shaft 14 so that the measuring head 10 rotates about the rotational axis defined by the shaft 12. During the scanning of the inner wall of the recess, measured values are recorded, which are transmitted to an evaluation apparatus and evaluated there. The manner in which such measured values are recorded and evaluated is generally known to those skilled in the art, and therefore is not explained in greater detail here.

The measuring device 2 according to the invention requires a small installation space in the radial direction of the shaft 12, so that it is also suitable for measuring relatively narrow boreholes or other recesses.

Due to the configuration according to the invention of the slide bearings 16, 16' of the slide bearing system, a play-free bearing of the shaft 12 on the base body 4 is ensured, even when wear occurs on the shaft 12.

The invention thus provides a measuring device which not only ensures high measuring accuracy, but also is robust and long-lasting.

Identical or corresponding components are provided with the same reference numerals in the various figures of the drawing and the various embodiments. If individual components are omitted in the figures of the drawing for purposes of illustration or representation, the components in question in the other figures are to be supplemented accordingly. It is apparent to those skilled in the art that the features of the individual embodiments are also exchangeable among the embodiments; thus, the features disclosed with respect to one embodiment may also be identically or correspondingly provided in the other embodiments. It is also apparent to those skilled in the art that the features disclosed in the individual embodiments, taken by themselves in each case, i.e., independently of the other features of the particular embodiment, further embody the invention.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A measuring device for measuring a rotationally symmetrical cavity in a workpiece, the device comprising:
 a) a base body provided for supporting on the workpiece;
 b) a measuring head provided and having at least one sensor for scanning an inner wall of the cavity;
 c) a shaft connected to the base body, the measuring head being movable relative to the base body in an axial direction of the shaft and rotatable about a rotational axis defined by the shaft; and
 d) the shaft being configured as a hollow shaft, and accommodates a drive shaft which is rotationally drivable by a rotary drive apparatus, a distal end of the drive shaft being connected to the measuring head in a rotationally fixed manner, and the shaft is situated on the base body so as to be movable in the axial direction of the shaft by means of a slide bearing system, and an axial drive apparatus being provided for moving the shaft relative to the base body.

2. The measuring device according to claim 1, wherein:
 a) the slide bearing system has at least one slide bearing having an inner part with a conical outer face, and an outer part with a conical inner face which has a complementary shape with respect to the conical outer face of the inner part;
 b) a clamp for clamping the inner part against the outer part is provided, such that the inner part is radially compressed by the outer part under the effect of the clamp.

3. The measuring device according to claim 2, wherein:
 a) the slide bearing system has two slide bearings situated at a distance from one another in the axial direction of the shaft.

4. The measuring device according to claim 2, wherein:
 a) the clamp has at least one spring.

5. The measuring device according to claim 1, wherein:
 a) the shaft is nondisplaceably situated on a slide, which is movable by a linear drive of the axial drive apparatus relative to the base body along a linear axis, in the axial direction of the shaft.

6. The measuring device according to claim 5, wherein:
 a) the linear drive is a spindle drive.

7. The measuring device according to claim 6, wherein:
 a) the spindle drive has a threaded spindle which is in rotary drive connection with an electric motor of the axial drive apparatus; and
 b) a spindle nut movable in the axial direction is provided in a rotationally fixed manner on the threaded spindle, and is nondisplaceably connected to the slide.

8. The measuring device according to claim 1, wherein:
 a) the drive, shaft is in rotary drive connection with an output shaft of an electric motor of the rotary drive apparatus via a belt drive.

9. The measuring device according to claim 5, wherein:
 a) an electric motor of the rotary drive apparatus is situated on the slide.

10. The measuring device according to claim 1, wherein:
 a) the rotary drive apparatus and the axial drive apparatus have electric motors that are independently controllable by a control apparatus.

11. The measuring device according to claim 10, wherein:
 a) the control apparatus is configured for automatically controlling the electric motors according to a measuring program in such a way that during measurement, the measuring head automatically approaches different locations on the inner wall in the peripheral direction of the shaft and/or in the axial direction of the shaft.

12. The measuring device according to claim 1, wherein:
 a) the at least one sensor is a tactile sensor.

13. The measuring device according to claim 1, wherein:
 a) the base body is a tubular part on which the slide bearing system is situated, and has a housing-like part in which the axial drive apparatus and the rotary drive apparatus are accommodated.

14. The measuring device according to claim 1, wherein:
 a) the measuring device configured for measuring the rotationally symmetrical cavity in a workpiece is configured for measuring a rotationally symmetrical inner cavity of a cylinder bore; and
 b) the measuring head for scanning the inner wall of the cavity is configured for scanning an inner wall of a cylinder bore.

* * * * *